Fig. 3

United States Patent Office 3,222,726
Patented Dec. 14, 1965

3,222,726
INJECTION SOLE MOLDING MACHINES
Paul W. Senfleben, Beverly, and William P. Crossen, Magnolia, Mass., assignors to United Shoe Machinery Corporation, Flemington, N.J., a corporation of New Jersey
Filed Feb. 19, 1963, Ser. No. 259,578
11 Claims. (Cl. 18—30)

This invention relates to injection molding machines and is herein illustrated in its application to machines for molding shoe soles or sole and heel units. In its general organization the illustrated machine is similar to a machine disclosed in United States Letters Patent No. 3,006,032, granted October 31, 1961, on an application filed in the names of Baker, Berggren, McIlvin and Spencer. While the invention is herein illustrated in its application to machines for molding shoe soles, it is to be understood that the invention is not limited in scope to machines of this type but is applicable generally to injection molding machines.

In an application for United States Letters Patent Serial No. 220,178, filed August 29, 1962, in the name of Paul W. Senfleben there is disclosed an injection molding machine designed to produce a shoe sole or a sole and heel unit. The machine illustrated in said application is provided with a mold assembly comprising an upper mold member which forms the foot facing surface of a sole, a bottom mold member which forms the tread surface of the sole or the sole and heel unit as the case may be, and an outer mold member which surrounds the upper mold member and the bottom mold member and forms the edge face of the sole. The upper mold member is mounted on a carrier which is attached to a conveyor means which moves the mold assembly to and from a mold charging station in which the mold cavity is injected with fluid plastic. The bottom mold member and the outer mold member are attached to a platen which is mounted for rectilinear movement relatively to the carrier to retract the bottom mold member and the outer mold member from their mold closing position into an intermediate position in which the outer mold member is spaced from the upper mold member and for swinging movement from its intermediate position into a mold opening position in which a newly molded sole is readily removable from the mold assembly comprising the bottom mold member and the outer mold member.

For holding the swinging assembly comprising the bottom mold member, the outer mold member, and the platen on which they are mounted in its mold closing position, the machine illustrated in said application is provided with manually operated clamping members arranged to act on the opposite side margins of the platen. It is an object of the present invention to facilitate and expedite the clamping of the swinging mold assembly in a machine of the type illustrated in the application above referred to by providing fully automatic means for clamping the swinging assembly in its mold closing position and for retracting the swinging assembly into its mold opening position. With the above object in view, the present invention in one aspect thereof contemplates the provision in a machine of the type above described of clamping means mounted on the carrier and arranged to engage the platen thereby to secure the swinging mold assembly in its mold closing position. Suitable power operated means is provided for retracting the clamping means in order to permit movement of the swinging assembly into its mold opening position, and means herein illustrated as power energized springs operates automatically to advance the clamping means into clamping position. The illustrated clamping means comprises a plurality of cam hooks which are automatically spring actuated to clamp the swinging assembly in its mold closing position, suitable power operated means being provided for retracting the hooks and energizing the springs.

In the illustrated organization a sprue barrel is provided for conducting fluid plastic from an injection nozzle into the mold cavity in the mold charging operation. The sprue barrel is mounted in the carrier and arranged to be received in a suitable recess provided in the upper mold member upon attachment of the mold member to the carrier. In order to obviate the flow of fluid plastic between the end of the barrel and the base of the recess in the upper mold member, the present invention provides means for applying pressure to the barrel to seat it firmly against the base of the recess. In the illustrated organization pressure is applied to the barrel by spring means mounted on the carrier and arranged to bear against an exposed portion of the barrel. The dimensions of the barrel are such that the attachment of the upper mold member to the carrier forces the barrel outwardly against the spring means thus causing the spring pressure exerted against the barrel to be taken by the base of the recess.

The machine illustrated in the application above referred to is provided with a gate valve for closing the injection nozzle and with a second gate valve for closing the sprue barrel. It is an object of the present invention to provide an improved means for automatically opening and closing said gate valves. With the above object in view, the present invention provides means in the mold charging station for operating said gate valves. The means for operating the gate valve in the sprue member includes valve shifter members and means for moving the shifter members into an inoperative position permitting conveyance of the ambulatory assembly from the mold charging station. The gate valve in the injection nozzle is incorporated in a sliding shaft and a suitable actuator is provided for imparting endwise movement to the shaft to open and close the valve. For operating the gate valve in the sprue barrel, two valve shifters are mounted on the sliding shaft and means is provided for rotating the shaft thereby to retract the valve shifters into a position in which they are out of the path of movement of the ambulatory assembly to and from the mold charging station. In order to obviate movement of the ambulatory assembly from the mold charging station when the valve shifters are in operating position the rotation of the valve shaft to bring the valve shifters into operating position operates means herein illustrated as a normally closed switch in an electric circuit to prevent the operation of the conveyor means.

The invention will now be described with reference to the accompanying drawings and pointed out in the appended claims.

The invention is illustrated in the drawings as embodied in a machine of the type shown in the patent to Baker et al. hereinbefore referred to and more specifically illustrated and described in the copending application of Paul W. Senfleben hereinbefore referred to. Machines of this type have a plastic injecting or mold charging organization and a plurality of ambulatory assemblies each carrying mold parts for molding a shoe sole. The ambulatory assemblies are mounted on an endless conveyor system which advances the assemblies successively into a discharging or unloading station in which a molded sole is manually removed from the open mold assembly whereupon the mold assembly is closed preparatory to another mold charging operation. From the discharging station each ambulatory assembly is advanced in one step to the mold charging station in which the mold cavity is charged with fluid plastic to form a shoe sole. From the mold charging station each ambulatory assembly is advanced in a plurality of steps along the endless path of movement of the conveyor system to the discharge station where the mold is discharged as above described preparatory to a repetition of the machine cycle.

Figure 1:
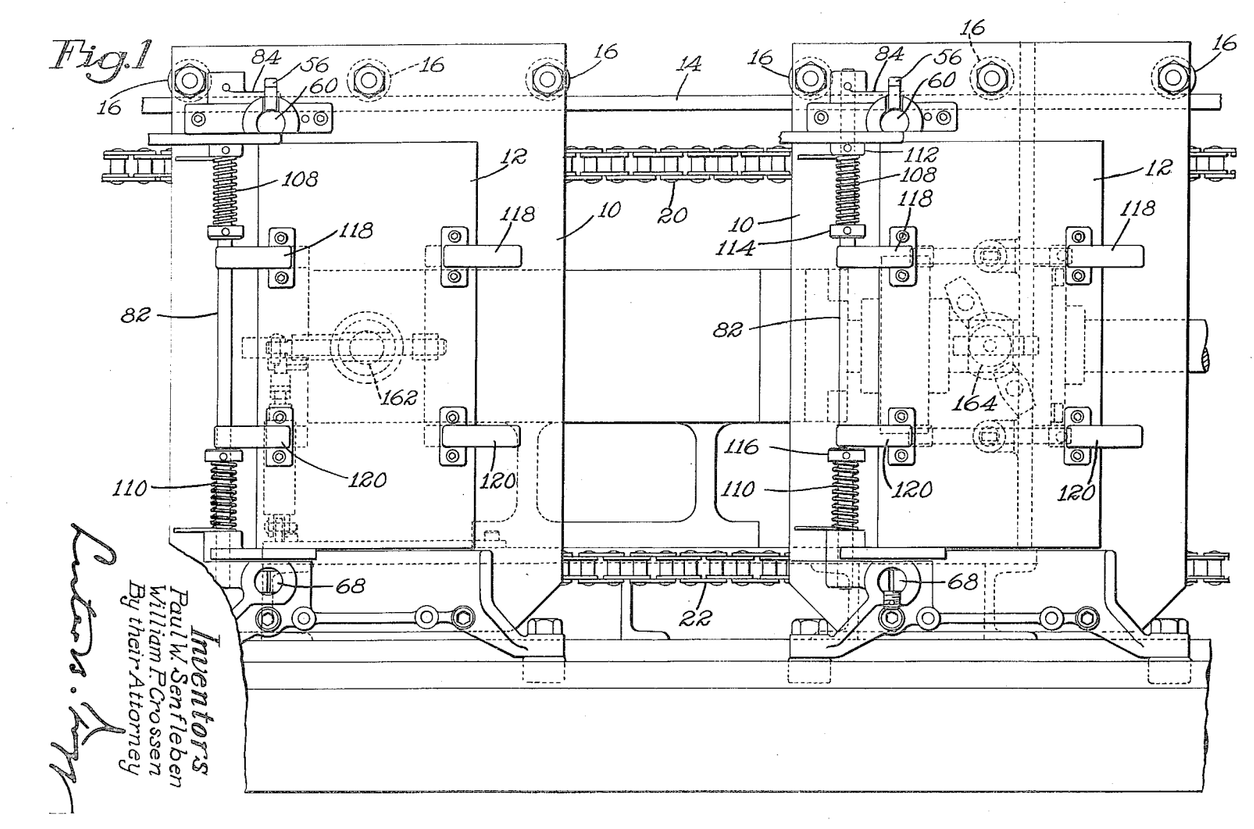
FIG. 1 is a front elevation illustrating two ambulatory assemblies in a machine embodying the features of the present invention, the ambulatory assembly on the left being located in the mold charging station and the ambulatory assembly on the right being located in the discharging or unloading station.

Each ambulatory assembly is provided with mold elements substantially similar to the mold elements disclosed in the Senfleben application above referred to. These mold elements include an upper mold member which is removably attached to a vertically disposed carrier plate 10 and constructed to form the foot facing surface of a molded sole or sole and heel unit as the case may be. Cooperating with the upper mold member is a bottom mold member which is removably attached to a platen 12, the bottom mold member being constructed to form the tread surface of the molded sole or sole and heel unit. As in the machine disclosed in the Baker et al. patent and in the machine of the copending Senfleben application, the carrier plate 10 is supported on an elevated rail 14 by three rollers 16 (FIG. 1). For guiding the ambulatory assembly, each roller has a tapered flange 18 (FIG. 3) which travels in a suitable groove formed in the rail 14. For removably attaching the carrier plate to two horizontal chains 20 and 22 of a conveyor system, the carrier plate has secured to its rear surface a plate 24 suitably recessed to receive the upstanding arm of a bracket 26 carried by the chain 20 and similarly a plate 28 secured to the lower portion of the carrier plate is suitably recessed to receive the upstanding arm of a bracket 30 carried by the chain 22.

Figure 3:
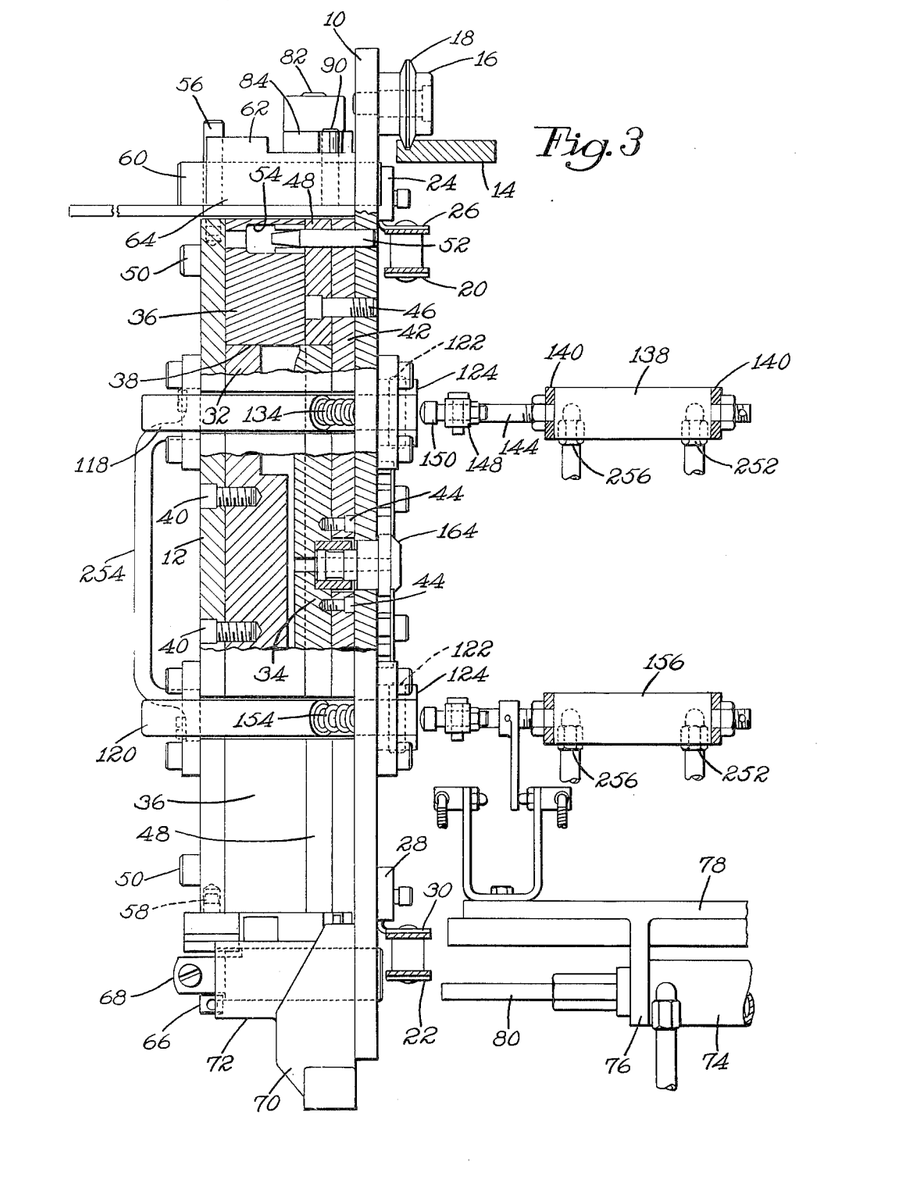
FIG. 3 is a right side elevation illustrating the ambulatory assembly shown in FIG. 2 together with certain operating instrumentalities in the discharging station.

Referring now more specifically to the mold assembly as shown in FIG. 3, the bottom mold member is identified by the numeral 32 and the upper mold member by the numeral 34. Cooperating with said mold members is an outer mold member 36 having a sole-shaped opening extending therethrough, the wall 38 of which forms all or the major part of the edge face of the sole. The bottom mold member and the upper mold member are closely fitted into the opening formed in the outer mold member, the bottom mold member being secured to the platen 12 by screws 40 and the upper mold member being secured to a rear platen 42 by screws 44. The rear platen in turn is secured to the carrier plate 10 by screws 46. Secured to the rear platen 42 by the screws 46 is a spacer plate 48 which is substantially thinner than the outer mold member 36 but otherwise is similar thereto. The spacer plate serves to determine the extent to which the upper mold member 34 telescopes into the outer mold member. In the illustrated organization the outer mold member is secured to the platen 12 by screws 50 and the registration of the outer mold member relatively to the upper mold member is determined by two dowel pins 52 mounted in alined bores extending through the spacer plate, the rear platen 42 and the carrier plate 10. Tapered forward end portions of the dowel pins are received within bushings tightly fitted into suitable counterbores 54 formed in the outer mold member 36.

The forward platen 12 is mounted for swinging movement on a vertical axis from an open position in which it is swung forwardly relatively to the carrier plate 10 into an intermediate position in which it is parallel to the carrier plate 10 but spaced forwardly from its mold closing position. From its intermediate position the platen moves a fraction of an inch in a rectilinear path into its mold closing position in which the outer mold member 36 is in contiguous relation to the spacer plate 48 as shown in FIG. 3. To provide for swinging movement of the platen 12 and the mold elements attached thereto from its open position to its intermediate position, an upper hinge pin 56 (FIG. 2) is arranged to extend downwardly into a socket formed in the upper portion of the platen 12 at a point adjacent to its left edge face, and a lower hinge pin 58 is arranged in axial alinement with the upper hinge pin 56 and is seated in a socket formed in the lower portion of the platen 12. The upper hinge pin is carried in a short horizontal shaft 60 mounted for sliding movement in a suitable horizontal bore formed in a cylindrical forward extension 62 of a casting 64 secured to the carrier plate 10. The lower portion of the hinge pin 58 is threaded for engagement in a tapped axial bore formed in a headed screw 66 and a suitable set screw is mounted in the tapped bore beneath the hinge pin 58 to secure the hinge pin in adjusted position relatively to the screw 66. The screw 66 is mounted in a vertical tapped bore in the forward portion of a short shaft 68 similar to the shaft 60, said shaft being mounted in a horizontal bore formed in a casting 70 secured to the carrier plate 10, the casting being provided with a cylindrical forward extension 72 for mounting the shaft. At its lower end the screw 66 is drilled to receive a capstan bar whereby the screw may be rotated to effect a micro-adjustment of the swinging mold assembly vertically relatively to the carrier plate 10. To provide for the clamping of the screw 66 in its adjusted position, the forward extremity of the shaft 68 is divided vertically into two sections to provide a split clamp structure, and a suitable clamping screw is provided for closing the split clamp structure on the screw.

Figure 2:
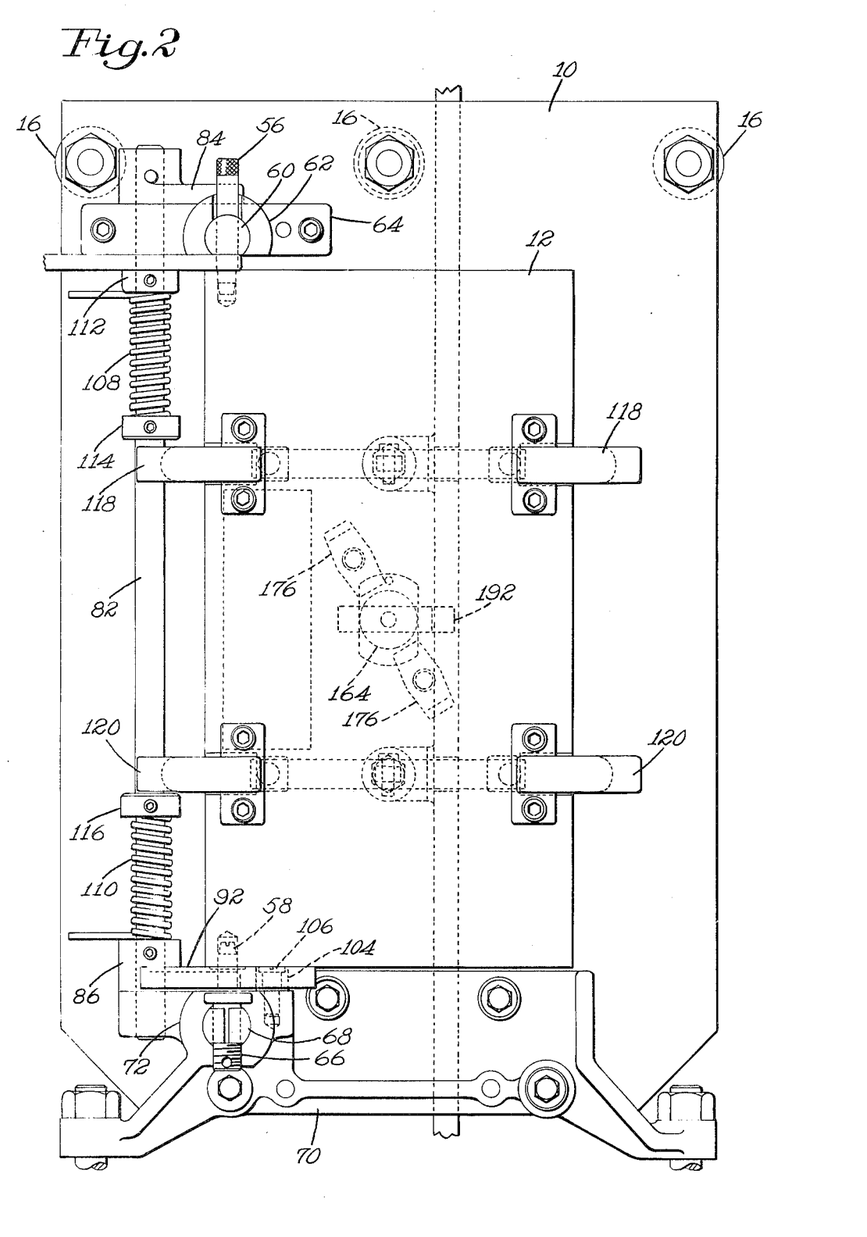
FIG. 2 is an enlarged view in front elevation illustrating the ambulatory assembly in the discharging station.
Figures 4, 5:
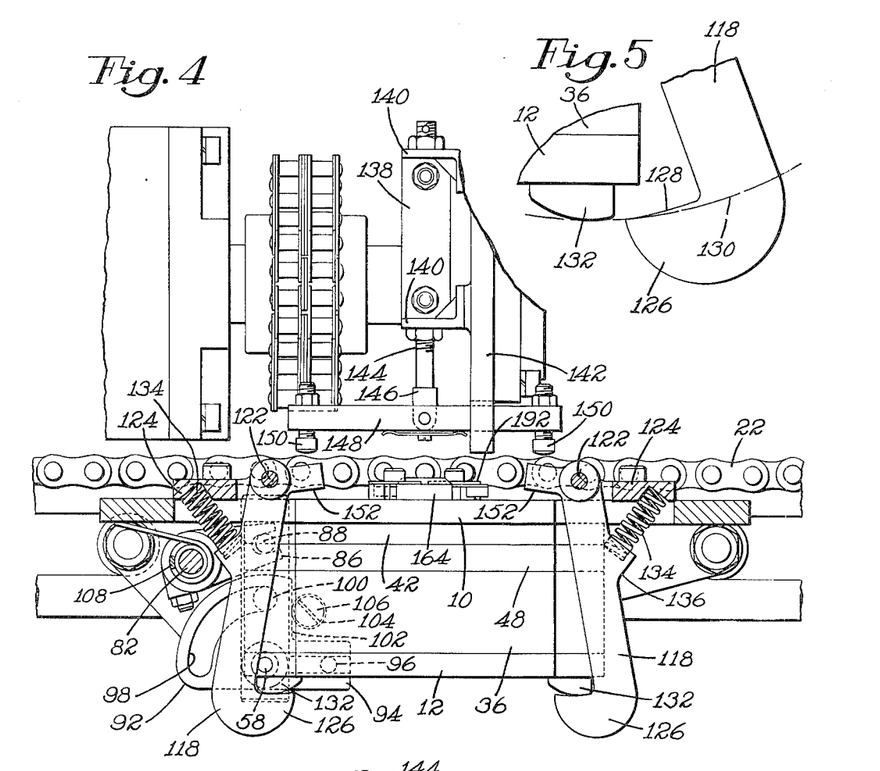
FIG. 4 is a plan view taken on the same scale as FIGS. 2 and 3 showing an ambulatory assembly in the discharging station and particularly the means for clamping the mold assembly in its closed position.
FIG. 5 is an enlarged view illustrating a portion of one of the clamping elements in its retracted or unclamped position.

The platen 12 and the mold parts thereon are moved forwardly in a rectilinear path from their mold closing position to their intermediate position by the pressure fluid operation of a piston mounted in a cylinder 74 (FIG. 3) secured to an arm 76 extending downwardly from a frame section 78. A rod 80 extending forwardly from the piston is arranged to engage the rear end of the shaft 68 and thrust it forwardly. The forward movement of the shaft 68 causes a like forward movement of the shaft 60 at the upper extremity of the mold assembly through the operation of mechanism now to be described. A vertical shaft 82 (FIG. 2) is journaled for rotation in suitable bearings in the upper casting 64 and the lower casting 70. Fixed to the upper portion of the shaft is a forked arm 84 and a similar arm 86 is fixed to the lower portion of the shaft. The forked end portion of the arm 86 embraces a pin 88 (FIG. 4) projecting upwardly from the sliding shaft 68 and similarly the forked end portion of the upper arm 84 embraces a pin 90 (FIG. 3) projecting upwardly from the sliding shaft 60. The pin 90 extends through a longitudinal slot formed in the casting 64. The forward end wall of the slot determines the limit of forward movement of the shaft 60 and thus determines the limit of the forward rectilinear movement of the platen 12 and the mold assembly carried thereby. During the forward movement of the platen 12 said platen is held against angular movement by mechanism now to be described. Referring to FIG. 4, the platen has secured to its lower edge face at its left end portion a horizontal plate comprising a quadrant 92 and a rectangular extension 94 having a front edge face common to the front edge face of the quadrant. The plate is arranged with said common edge face parallel to and spaced forwardly from the platen 12, and the axis of curvature of the arcuate edge face of the quadrant 92 is arranged in concentric relation to the hinge pin 58 which extends through a bore in said plate. The plate is held against angular movement relatively to the platen 12 by a pin 96 extending through the extension 94 and into the lower portion of the platen. Formed in the quadrant 92 is an arcuate slot 98 arranged in concentric relation to the hinge pin. Projecting upwardly into the slot is the head of a pin 100 carried by the shaft 60. When the platen 12 is in mold closing relation to the rear platen 42 an edge face 102 of the quadrant is perpendicular to the rear platen and bears against a roll 104 freely mounted on a headed screw 106 projecting upwardly from the casting 70. The rear end wall of the arcuate slot 98 is so located that when the platen 12 is in its position shown in FIG. 4 the pin 100 bears against said end wall and prevents angular movement of the platen in a counterclockwise direction during its forward movement while the roll 104 bearing against the edge face 102 prevents angular movement of the platen in a clockwise direction. Upon the completion of the rectilinear forward movement of the platen 12 the arcuate edge face of the quadrant comes into tangential relation to the periphery of the roll 104 and the platen is free to swing within the limit afforded by the length of the slot 98. Upon the return of the platen 12 from a mold opening position to a position in which it is parallel to the rear platen 42 and arranged in its intermediate position, two torsion springs 108 and 110 rotate the shaft 82 in a counterclockwise direction as seen in FIG. 4 to return the platen to its mold closing position illustrated in FIG. 4. As shown in FIG. 2, the torsion spring 108 surrounds the shaft 82 and is confined between collars 112 and 114 fixed to the shaft. The lower end portion of the spring is bent downwardly and inserted into a bore in the collar 114 and the upper end portion is extended horizontally for engagement with the front face of the carrier plate 10. Similarly, the lower torsion spring 110 surrounds the shaft 82 and is confined between a collar 116 fixed to the shaft and the hub of the arm 86. The upper end portion of the spring is bent upward and inserted into a bore in the collar 116 and the lower end portion is extended horizontally for engagement with the front face of the carrier plate 10.

Figure 6:
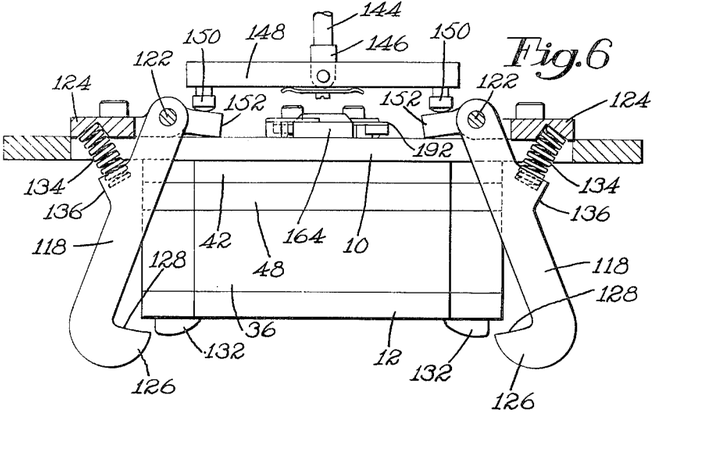
FIG. 6 is a plan view similar to FIG. 4 showing the clamping elements disengaged from the mold assembly.

For clamping the forward platen 12 and the mold parts carried thereby in their mold closing position illustrated in FIG. 4 the illustrated machine is provided with four clamping hooks comprising an upper pair 118 (FIG. 2) and a lower pair 120. Referring to FIG. 3, each cam hook is pivotally mounted for swinging movement on a pin 122 mounted in the bifurcated portion of a plate 124 (FIG. 6) secured to the rear surface of the carrier plate 10. As shown in FIG. 3, clearance is provided for the swinging movement of each of the cam hooks by forming suitable notches in the platens 12 and 42 and in the outer mold member 36 and the spacer plate 48. Referring to FIG. 5, each of the clamping hooks has at its forward extremity an offset end portion 126 characterized by a clamping surface 128 which is arcuate in shape but slightly eccentric to the path of movement of the end portion of the hook indicated by a broken line 130. Movement of the hook 118 to the left as seen in FIG. 5 causes the clamping surface 128 to engage the convex forward surface of a plate 132 secured to and extending forwardly from the platen 12 and to exert a cam action on the plate thereby to clamp the platen 12 and the mold parts carried thereby in their mold closing position as shown in FIG. 4. Each hook is advanced from its retracted position illustrated in FIG. 6 into its clamping position illustrated in FIG. 4 by the expansion of a spring 134, one end of which is seated in a socket formed in a boss 136 projecting outwardly from the hook, and the other end of which is seated in a socket formed in the plate 124. For retracting the upper pair of cam hooks 118 a pressure fluid operated piston is mounted in a cylinder 138 (FIG. 3) secured to brackets 140 (FIG. 4) fixed to a frame section 142. Extending forwardly from the piston is a rod 144 having at its forward end a head 146 to which there is pivoted a cross bar 148 which carries at its opposite ends abutment screws 150 arranged to engage short arms 152 projecting from the hubs of the upper hooks 118, respectively. For advancing the lower clamping hooks 120 (FIG. 3) into clamping position each hook is provided with a spring 154 similar in its construction and operation to the spring 134 provided for each hook 118. For retracting the hooks 120, a cylinder 156 similar to the cylinder 138 is fixed to the machine frame and is provided with a piston assembly similar to that above described for acting on short arms projecting from the arms 120 thereby to retract them into the position indicated in FIG. 6.

Figures 7, 8:
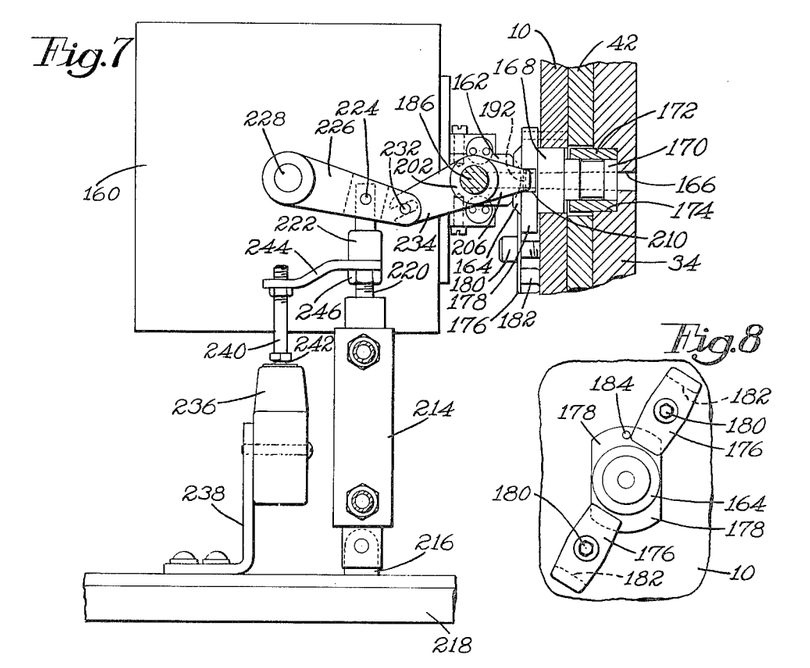
FIG. 7 is a left side elevation showing in section on a plane common to the sprue passage a portion of a mold assembly in the mold charging station and illustrating, particularly, means for operating a gate valve in the injection nozzle and a second gate valve in the sprue member carried by the mold assembly.
FIG. 8 is a detailed view in rear elevation illustrating means for retaining the sprue member in the mold assembly.

For charging the mold cavity of an ambulatory assembly in the mold charging station there is provided an injection means indicated generally by the rectangle 160 in FIG. 7. The injection means is provided with a suitable ram (not shown) whereby fluid plastic is injected through a nozzle 162 into a sprue barrel 164 and from the barrel through a port 166 in the upper mold member 34 into the mold cavity. The sprue barrel has a cylindrical hub 168 slidably mounted in a bore in the carrier plate 10. The hub 168 has an extension 170 of reduced diameter on which is fixed a collar 172 which is seated against the base of a counterbore 174 formed in the upper mold member 34. For seating the collar 172 firmly against the base of the counterbore, two flat springs 176 (FIG. 8) extend in opposite directions from the outer end portion of the sprue barrel 164 for engagement with oppositely extending flanges 178 formed in the barrel. As shown in FIG. 7, the flanges are slightly spaced from the carrier plate 10 in order to insure a firm seating of the collar 172 against the base of the counterbore. Each of the springs 176 is attached by a headed screw 180 to the carrier plate 10 and a spacer member 182 is secured to the outer portion of each spring to maintain a parallel relation between the spring and the carrier plate. A dowel 184 mounted in the upper flange 178 and extending into a bore in the carrier plate 10 holds the sprue barrel 164 against rotation and maintains the desired relation between the flanges 178 and the springs 176 shown in FIG. 8. It will be understood that each ambulatory assembly is provided with a spring pressed sprue barrel constructed and arranged as above described.

Figure 9:
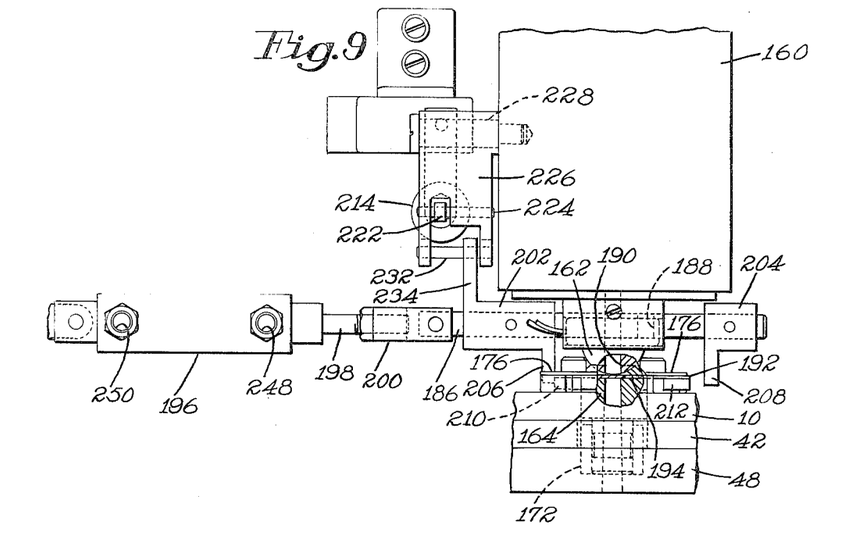
FIG. 9 is a plan view illustrating the valve operating mechanism shown in FIG. 7.

Referring to FIGS. 7, 8 and 9, the illustrated machine is provided with a gate valve for opening and closing the injection nozzle and also with a gate valve for closing the sprue barrel 164 in order to prevent back flow of fluid material from the mold cavity through the sprue barrel when the sprue barrel is disengaged from the injection nozzle in the movement of the mold assembly into its indexing position.

The gate valve in the injection nozzle comprises a horizontal shaft 186 mounted for sliding movement diametrically through the injection nozzle. The shaft 186 has formed therein a valve port comprising a drilled hole 188 (FIG. 9) extending diametrically through the shaft. When the valve in the injection nozzle is closed the shaft 186 is at the limit of its movement to the right as seen in FIG. 9 and the valve port 188 is offset from the nozzle passage 190. For closing the passage in the sprue barrel 164 a valve member in the form of a thin plate 192 is arranged to extend lengthwise horizontally and widthwise vertically and is mounted in a suitable passage in the outer end portion of the barrel. The valve plate is provided with a suitable port 194. In FIG. 9 the valve plate is shown in its closed position with the port 194 offset to the right from the passage in the sprue barrel. The illustrated machine is provided with means in the mold charging station which operates substantially concomitantly on the valve shaft 186 and the valve plate 192, first to open the two valves preparatory to the mold charging operation and upon the completion of the mold charging operation to close the two valves preparatory to movement of the mold assembly away from the injection nozzle into its indexing position. For operating the valve shaft 186 a pressure fluid operated piston is mounted in a cylinder 196 fixed to the machine frame. As shown in FIG. 9, a piston rod 198 extends to the right from the cylinder 196 and is connected by a suitable coupling 200 to the left end portion of the valve shaft 186. For operating the valve plate 192 the valve shaft 186 has secured thereto collars 202 and 204 having, respectively, arms 206 and 208 extending forwardly from their inner end portions. The arm 206 is arranged to engage a reinforcing member or block 210 secured to the left end portion of the valve plate 182 and, similarly, the arm 208 is arranged to engage a reinforcing member or block 212 secured to the right end portion of the valve plate. In the movement of the valve shaft 186 to the left from its position shown in FIG. 9, the arm 208 first traverses a measured lost motion and then engages the block 212 and moves the valve plate to the left into a valve opening position determined by the engagement of the block 212 with the projecting head of the sprue barrel 164. After the valve shaft 186 has been moved to the right into its valve closing position illustrated in FIG. 9, the arms 206 and 208 are swung downwardly approximately 60° to provide clearance for the indexing movement of the ambulatory assembly in the mold charging station. Such downward movement of the arms 206 and 208 is effected by the upward movement of a piston in a cylinder 214 pivotally mounted at its lower extremity on a bracket 216 secured to a horizontal rail 218 in the machine frame. The piston is provided with a rod 220 extending upwardly from the cylinder 214 and having at its upper extremity a head 222 which is pivotally mounted on a pin 224 carried by a lever 226 fulcrumed at 228 on the fixed block 160 of the mold charging means. Referring to FIG. 9, the bifurcated free end portion of the lever 226 carries a cross pin 232 which receives the notched end portion of an arm 234 extending rearwardly from the collar 202. The bifurcations in the lever 226 are spaced apart from each other sufficiently to permit movements of the arm 234 lengthwise of the cross pin 232 incidental to the valve opening and closing movements of the valve shaft 186. In order to prevent the operation of the conveyor system while the arms 206 and 208 are swung upwardly into their operating position shown in FIGS. 7 and 9 there is provided in an electrical circuit controlling the operation of the conveyor, a normally closed switch mounted in a housing 236 (FIG. 7) secured to a bracket 238 fixed to the rail 218. During the downward movement of the piston to swing the arms 206 and 208 upwardly into their operating positions, a presser member herein illustrated as a headed screw 240 is moved downwardly by the piston and depresses a switch button 242 thereby to open the switch. The screw 240 is threaded into a bent arm 244 mounted on the piston rod 220 and clamped against the base of the head 222 by a nut 246.

In the operation of the illustrated machine an ambulatory assembly in which the mold is closed, as shown in FIGS. 2, 3 and 4, is advanced by the conveyor means into the mold charging station with the injection nozzle 162 and the sprue barrel 164 closed as shown in FIG. 9. After the sprue barrel comes into registration with the injection nozzle in the mold charging station the ambulatory assembly is swung rearwardly to bring the sprue barrel into mating engagement with the injection nozzle as shown in FIG. 9. Thereupon pressure fluid flows through a port 248 in the cylinder 196 to move the piston rod 198 to the left thereby to open the gate valve in the nozzle 162. During the movement of the valve shaft 186 to the left, the arm 208 engages the block 212 and shifts the gate valve 192 in the sprue barrel into its open position. Upon the completion of the mold charging operation and while the sprue barrel 164 remains in mating engagement with the injection nozzle, pressure fluid flows through a port 250 in the cylinder 196 to cause the return of the valve shaft 186 and the gate valve 192 to their respective closed positions illustrated in FIG. 9. The ambulatory assembly in the mold charging station is then moved forwardly into its indexing position. In the ensuing operations of the conveyor means the ambulatory assembly is advanced through a plurality of idle stations while the charge in the mold cavity sets sufficiently to permit the discharge or removal thereof from the mold cavity in the unloading or discharging station. When the ambulatory assembly reaches the discharging station, pressure fluid flows through the rear ports 252 of the cylinders 138 and 156 (FIG. 3) and retracts the clamp hooks 118 and 120 into their respective retracted positions illustrated in FIG. 6, and thereupon the piston in the cylinder 74 is advanced to impart forward sliding movement to the shaft 68 and through connections hereinbefore described to the upper shaft 60 thereby effecting the forward rectilinear mold opening movement of the assembly comprising the forward platen 12, the bottom mold member 32 and the outer mold member 36. Preferably said assembly is moved forwardly with sufficient velocity to cause at least a partial swinging movement of the assembly into its mold opening position. In the event that such swinging movement must be completed manually, a suitable D handle 254 (FIG. 3) is secured to the forward platen 12. The newly molded sole and heel unit is carried forwardly with the swinging assembly. Upon the completion of the mold opening operation the sole and heel unit is manually discharged or removed from the mold cavity whereupon the swinging assembly is manually returned to its intermediate position in which the platen 12 is parallel to the rear platen 42 but is spaced forwardly from its mold closing position. Upon the arrival of the swinging assembly in its intermediate position the springs 108 and 110 (FIG. 2) advance the swinging assembly into its mold closing position. Thereupon pressure fluid flows through the ports 256 in the forward portions of the cylinders 138 and 156, respectively, thereby retracting the abutment screws into their inoperative positions illustrated in FIGS. 3 and 4 and thus permitting the springs 134 and 154 to advance the cam hooks into their clamping position shown in FIG. 4. The ambulatory assembly then advances into the mold charging station for a repetition of the cycle of operations above described.

Having thus described our invention, what we claim as new and desire to secure by Letters Patent of the United States is:

1. In combination, a mold assembly comprising an upper mold member and a bottom mold member, a carrier for the upper mold member, a platen to which the bottom mold member is attached, means on which the platen is mounted for movement relatively to the carrier into a mold opening position, said mounting means itself being mounted for movement relatively to the carrier thereby to effect an initial parting of the mold members, clamping means mounted on the carrier and arranged to engage opposite side margins of the platen thereby to secure the bottom mold member in its mold closing position, power operated means for retracting the clamping means in order to permit movement of the platen into its mold opening position, and means which operates automatically upon retraction of the power operated means to advance the clamping means into clamping position.

2. In combination, a mold assembly comprising an upper mold member and a bottom mold member, means mounting said mold members for movement between a mold closing and a mold opening position, a cam hook for securing the mold members in mold closing position, power operated means for disengaging the cam hook in order to permit movement of the mold members into mold opening position, and means operating automatically upon retraction of the power operated means for advancing the cam hook into clamping position.

3. In combination, a mold assembly comprising an upper mold member and a bottom mold member movable relatively to each other between mold closing and mold opening position, a cam hook constructed and arranged to clamp the mold members in mold closing position, power operated means for retracting the cam hook from its clamping position into a position permitting movement of the mold members into mold opening position, and a spring acting on the cam hook and arranged to be energized by retracting movement of the cam hook so that upon retraction of the power operated means the spring operates to advance the cam hook into its clamping position.

4. In an injection molding machine, a mold assembly including an upper mold member, an axially slidable sprue barrel constructed and arranged for mating engagement with an injection nozzle, said barrel being seated in a counterbore provided in the upper mold member, means for applying pressure to the barrel to move the barrel axially thereby to seat the barrel firmly against the base of the counterbore to obviate the flow of fluid plastic between the end of the barrel and the seat of the counterbore, a carrier for the mold assembly, and means for removably securing the upper mold member to the carrier comprising only fastening members spaced away from the sprue barrel.

5. In an injection molding machine, a mold assembly including a carrier, a mold member attached to the carrier, a sprue barrel constructed and arranged for mating engagement with an injection nozzle, said barrel being slidably mounted in an aperture provided in the carrier and seated against the base of a suitable recess provided in the mold member, means mounted on the carrier and arranged to apply pressure to the barrel thereby to seat it firmly against the base of the recess thus to prevent the flow of fluid plastic between the inner end portion of the barrel and the base of the recess, and means for removably securing the upper mold member to the carrier comprising only fastening members spaced away from the sprue barrel whereby the mold member is removable from the carrier without disturbing the sprue barrel.

6. In an injection molding machine, a mold charger including an injection nozzle and a mold assembly including a carrier plate, a mold member, a spacer between the carrier plate and the mold member, a sprue barrel constructed and arranged for mating engagement with the injection nozzle, said sprue barrel being slidably mounted in an aperture provided in the carrier plate, said barrel extending through an opening in the spacer and into a recess formed in the mold member, spring means mounted on the carrier and arranged to bear against an exposed portion of the barrel thereby to press the barrel firmly against the base of the recess thus to prevent flow of fluid plastic between the inner end portion of the barrel and the base of the recess, and means for removably securing the upper mold member to the carrier plate comprising only fastening members spaced away from the sprue barrel.

7. In an injection molding machine, the combination with a mold charger including an injection nozzle of an ambulatory assembly comprising a carrier member and mold elements mounted thereon, means for conveying the ambulatory assembly to and from a mold charging station, a sprue barrel mounted in the ambulatory assembly and arranged for mating engagement with the injection nozzle, a gate valve in the injection nozzle, a gate valve in the sprue barrel, and means in the injection station for operating the gate valve in the sprue barrel, said operating means including valve shifter members, and means for moving said valve shifter members into an inoperative position permitting conveyance of the ambulatory assembly from the injection station.

8. In an injection molding machine, the combination with a mold charger including an injection nozzle of an ambulatory assembly comprising a carrier member, mold elements attached to the carrier member, and a sprue barrel mounted in the carrier member and arranged for mating engagement with the injection nozzle, a gate valve formed in a sliding shaft mounted in the nozzle, a second gate valve incorporated in the sprue barrel, an actuator for imparting endwise movement to the sliding shaft thereby to operate the gate valve in the injection nozzle, two valve shifters mounted on the sliding shaft and arranged to operate the gate valve in the sprue barrel, and means for rotating the sliding shaft thereby to retract the valve shifters into a position in which they are out of the path of movement of the ambulatory assembly to and from the mold charging station.

9. In an injection molding machine, the combination with a mold charger including an injection nozzle of an ambulatory assembly comprising a carrier member, mold elements attached to the carrier member and a sprue barrel mounted in the carrier member and arranged for mating engagement with the injection nozzle, a gate valve formed in a sliding shaft mounted in the nozzle, a second gate valve incorporated in the sprue barrel, an actuator for imparting endwise movement to the sliding shaft thereby to operate the gate valve in the injection nozzle, two valve shifters mounted on the sliding shaft and arranged to operate the gate valve in the sprue barrel, means for rotating the sliding shaft thereby to retract the valve shifters into a position in which they are out of the path of movement of the ambulatory assembly to and from the mold charging station, conveyor means for moving the ambulatory assembly to and from the mold charging station, and means operated by the valve shaft rotating means for preventing the operation of the conveyor means when the valve shifters are in their operative position.

10. In an injection molding machine, a mold assembly including a carrier and a mold member secured to the carrier, a sprue barrel having a head and a shank portion, the shank portion being slidably mounted in an aperture provided in the carrier, pressure means mounted on the carrier and constructed and arranged to bear against the head of the sprue barrel thereby to hold the head against the carrier when the mold member is detached from the carrier and when the mold member is mounted on the carrier to seat the end of the shank portion of the barrel against the base of a recess in the mold member with the head of the barrel spaced from the carrier sufficiently to insure a firm contact of the end of the shank portion of the barrel against the base of the recess, the sprue barrel being disengageable from the mold member by a movement of separation of the carrier from the mold member.

11. In an injection molding machine, a mold assembly comprising an upper mold member and a bottom mold member, a carrier for the mold assembly, a sprue barrel constructed and arranged for mating engagement with an injection nozzle, means for securing the upper mold member to the carrier comprising only fastening members spaced away from the sprue barrel, said barrel being mounted in the carrier and slidable in a counterbore provided in the upper mold member, means for applying pressure to the barrel to seat the barrel firmly against the base of the counterbore thereby to obviate the flow of fluid plastic between the end of the barrel and the seat of the counterbore, means mounting the mold members for movement between a mold closing and a mold opening position, a cam hook for securing the mold members in mold closing position, power operated means for disengaging the cam hook in order to permit movement of the mold members into mold opening position, and means operating automatically upon retraction of the power operated means for advancing the cam hook into clamping position.

References Cited by the Examiner

UNITED STATES PATENTS

| | | | |
|---|---|---|---|
| 2,300,759 | 11/1942 | Amigo | 18—30 |
| 2,358,341 | 9/1944 | Malm | 18—42 |
| 2,428,664 | 10/1947 | Gregg | 18—42 |
| 2,937,405 | 5/1960 | Berggren et al. | 18—30 |
| 2,988,779 | 6/1961 | Barton et al. | 18—30 |
| 3,006,032 | 10/1961 | Baker et al. | 18—30 |
| 3,014,242 | 12/1961 | Baker et al. | 18—30 |
| 3,055,056 | 9/1962 | Barton | 18—30 |
| 3,131,432 | 5/1964 | Battel et al. | 18—30 |

J. SPENCER OVERHOLSER, *Primary Examiner.*

ROBERT F. WHITE, MICHAEL V. BRINDISI, WILLIAM J. STEPHENSON, *Examiners.*